United States Patent [19]

Duffield

[11] Patent Number: 4,599,126

[45] Date of Patent: Jul. 8, 1986

[54] METHOD FOR SEVERING LAMINATES

[75] Inventor: Dean W. Duffield, South Camden, Australia

[73] Assignee: Precision Valve Australia Pty, Limited, New South Wales, Australia

[21] Appl. No.: 491,319

[22] PCT Filed: Aug. 27, 1982

[86] PCT No.: PCT/AU82/00144

§ 371 Date: Apr. 19, 1983

§ 102(e) Date: Apr. 19, 1983

[87] PCT Pub. No.: WO83/00841

PCT Pub. Date: Mar. 17, 1983

[30] Foreign Application Priority Data

Aug. 28, 1981 [AU] Australia ............................... PF0480

[51] Int. Cl.⁴ ............................................... B32B 31/00

[52] U.S. Cl. ....................................... 156/268; 29/413; 83/862; 83/880; 83/881; 156/510

[58] Field of Search ............... 156/268, 257, 251, 209, 156/219-220; 83/883-887, 880-882, 862-864; 493/61-62; 72/334; 29/413

[56] References Cited

U.S. PATENT DOCUMENTS

| | | | |
|---|---|---|---|
| 2,284,254 | 5/1942 | Batcheller | 156/268 |
| 2,352,339 | 6/1944 | Olney | 83/883 |
| 3,547,724 | 12/1967 | Zagusta | 156/233 |
| 3,604,295 | 9/1971 | Clark | 83/875 |
| 3,656,379 | 4/1972 | Clark | 83/877 X |
| 3,713,944 | 1/1973 | Dennis et al. | 156/261 |
| 3,812,002 | 5/1974 | Lurie | 156/220 X |
| 4,386,925 | 6/1983 | Focke | 493/61 X |

*Primary Examiner*—David Simmons

*Attorney, Agent, or Firm*—William F. Kilgannon

[57] ABSTRACT

A method of severing laminates (10) of the type having a metal layer (11) and a synthetic plastics layer (12). The method comprises forming a channel section indentation (13) in the laminate (10) along a line (14) on which the laminate (10) is to be severed, the indentation (13) being of such depth as to extend through the full thickness of the plastics layer (12) and through a part of the thickness of the metal layer (11), such that the plastics material along the line of the indentation (13) is substantially displaced laterally, and severing the laminate (10) along the line (14) of the indentation (13) in the metal layer (11). An apparatus for carrying out the method is disclosed as is the application of the method and apparatus to the production of container tops.

9 Claims, 3 Drawing Figures

METHOD FOR SEVERING LAMINATES

Figure 1:
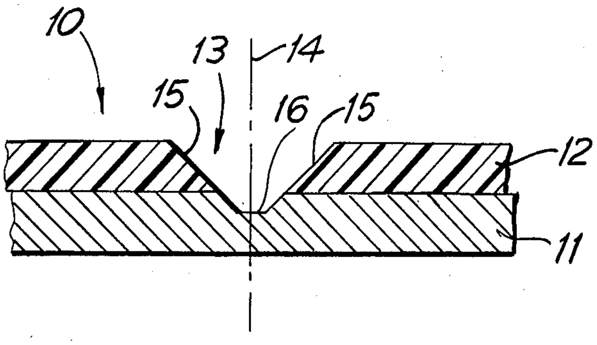

The present invention relates to a method for severing laminates of a plastic material and a metal. More particularly the invention relates to a method for severing such laminates in a way which reduces the likelihood of delamination taking place between the plastic material and the metal during or after the severing of the laminate.

It is known to form laminates of a synthetic plastic material, such as polyolefins and polyamides, and a metal such as tinplate. It has been proposed to use such laminates in the formation of containers and like goods. It has been found that conventional metal shearing and punching techniques are not satisfactory for severing such laminates when they are to be formed up into finished articles. Conventional shearing techniques have been found to predispose the severed laminate to delamination. This predisposition to delamination is particularly noticeable where an edge portion of the severed laminate is to be deformed such as by being rolled up into a seam or by being drawn into a formed shape. The delamination may be exhibited by the complete or partial separation of the plastic layer from the metal layer or by the formation of wrinkles or puckering in the plastic layer, particularly at the edges of the laminate.

It has been proposed in U.S. Pat. Nos. 3,604,295 and 3,656,379 to sever laminates of the type to which the present invention relates by firstly cutting a groove in the plastic layer up to its interface with the metal layer and then, in a separate operation, cutting through the metal layer.

The present inventions have found that the potential for delamination may be substantially reduced by forming an indentation in the laminate which extends through the plastic layer and into the metal layer. This indentation being caused by means which cause the plastic material along the line of the indentation to be displaced substantially laterally. This invention differs from the prior art described above both in that the indentation is formed by displacement of the plastic material rather than by cutting it out and in that the indentation extends through the plastic layer into the metal layer. It is believed that these two features contribute significantly to the efficacy of the process according to this invention.

The present invention consists in a method of severing a laminate of the type including a layer of a metal and a layer of a flexible synthetic plastic material, the method comprising forming an indentation of substantially channel-shaped cross section in the laminate along a line on which the laminate is to be severed, the indentation being of such depth as to extend through the full thickness of the plastic layer and through a part of the thickness of the metal layer, such that the plastic material along the line of the indentation is substantially displaced laterally; and severing the laminate along the line of the indentation in the metal layer.

The present invention further consists in an article consisting of a portion of a laminate of the type comprising a layer of a metal and a layer of a flexible synthetic plastic material which has been severed from a sheet of such laminate by the method according to this invention.

The present invention still further consists in apparatus for severing a laminate of the type including a layer of a metal and a layer of a deformable synthetic plastic material, the apparatus comprising means to form along a line of intended severance an indentation in a laminate of the said type, the indentation being of substantially channel-shaped cross section and being of such a depth as to extend through the full thickness of the plastic layer and through a part of the thickness of the metal layer, and means for severing the laminate along the line of the indentation in the metal layer.

As used in this specification the expression "an indentation of substantially channel-shaped cross sectional shape" means an indentation which, when seen in cross section, has a pair of side walls which are parallel or inclined towards one another and which either meet at the base of the channel in an apex or are separated from one another in the base of the channel by a channel floor. It is preferred that the side walls of the channel-shaped indentation taper towards one another and are separated slightly from one another in the base of the channel by a narrow channel floor. It is particularly preferred that at least one side wall of the indentation be inclined at an obtuse angle to the surface of the laminate i.e. the included angle between the side wall of the indentation and the adjacent surface of the laminate is between 90° and 180°. This angle is more preferably from 110° to 160° and most preferably 135°.

The indentation in the laminate is preferably formed by stamping, pressing or rolling the laminate with a suitable tool while the laminate is suitably supported beneath the tool. The indentation may be linear or curved. The indentation may if desired define a closed figure such as a circle, a square or a rectangle.

The severing of the laminate along the line of the indentation in the metal is preferably carried out by a conventional shearing operation.

It is believed, although the applicants do not wish to be bound to this theory, that the method according to this invention is advantageous for three reasons. Firstly the initial indentation of the metal means that there is less metal to be sheared through in the second cutting step. This reduction in metal thickness leads to less stress deformation of the metal as it is sheared and accordingly less likelihood of disruption of the bond between the metal and plastic layers in the laminate. Secondly it is thought that the pressure applied to the laminate as the indentation is formed may cause some kind of supplementary bond to be formed between the plastic and the metal along the line of the indentation. Thirdly the majority of the plastic material along the line of the indentation is caused to flow laterally back over the adjacent metal. This means that when the metal is sheared the plastic layer will be slightly recessed back from the edge of the metal. It is believed that this can prevent the mechanical disruption of the bonds between the plastic and metal layers of articles made by the present method during handling of the article after severance. This third advantage is particularly important when an edge portion of the article is curled or rolled during or after the severing step with the plastics layer on the inside of the curled or rolled portion of the article.

It will be appreciated that the present method is applicable principally to laminates comprising a single layer of plastic material and a single layer of a metal. It could also be used in laminates having more than two layers. In the case of a single metal layer sandwiched between a pair of layers of a flexible synthetic plastic material it might be necessary to make deformations on each side of the metal layer, each extending into the metal layer, to achieve the advantages of the present invention. Any suitable metal could be used in the metal layer however the preferred metals are tinplate, black plate, low tin steel plate, tin free steel plate, and aluminum and its alloys. Any suitable deformable synthetics plastic material may be used in the plastic layer however the polyolefins, particularly polyethylene and polypropylene, and polyamides, particularly nylon, are preferred.

Laminates of the type including a layer of a metal and a layer of a deformable synthetic plastic material are seen as being of particular use in the formation of lids or caps for containers. Conventionally many lids or caps for containers include a gasket or other sealing layer designed to form a fluid tight seal between the lid or cap and the container to which it is to be applied. It is conceived that the use of a metal/plastic laminate would alleviate the need for a separate gasket as the plastic layer itself could form a sealing membrane between the metal of the cap or lid and the remainder of the container. This has the advantage that the separate step of applying a gasket to a formed container lid or cap is avoided as is the necessity for quality control inspection of the product after the gasket has been applied.

The present invention still further consists in a method for forming a container top having a portion arranged to engage with and form a sealing contact with a container body, the method comprising the steps of: p (a) forming a blank to the general shape of the container top from a laminate of the type including a layer of a metal and a layer of a deformable synthetic plastic material, the blank formation being performed so that the plastic layer is maintained in adhesion with the metal layer and extends across the surface area of the said engagement and sealing contact portion;

(b) forming a substantially channel-shaped indentation in said blank around a closed line located radially outwardly of the said engagement and sealing contact portion, which indentation is of such depth as to extend through the full thickness of the plastic layer and through a part of the thickness of the metal layer, such that the plastic material along the line of the indentation is substantially displaced laterally; and (c) severing the blank along the line of the indentation in the metal layer.

The present invention also provides apparatus for forming a container top having a portion arranged to engage with and form a sealing contact with a container body from a laminate of the type including a layer of a metal and a plastic material, said apparatus including:

(a) blank forming means for forming a blank, from a laminate of the said type, into the general shape of the container top with the plastic layer extending across the surface area of the said engagement and sealing contact portion;

(b) means for forming a substantially channel section indentation in said blank around a closed line located radially outwardly of the said engagement and sealing contact portion, which indentation is of such depth as to extend through the full thickness of the plastic layer and through a part of the thickness of the metal layer, such that the plastic material along the line of the indentation is substantially displaced laterally; and (c) means for severing the blank along the line of the indentation in the metal layer.

In the latter aspects of this invention it is preferable that the method and apparatus provide for the cutting of the laminate to form a blank which is largely but not completely separated from the laminate and the subsequent formation of the blank to the general shape of the container top by stamping or like means.

The indentation in the laminate is preferably formed by an annular die having a truncated v-shape in cross section. The severing of the blank along the line of the indentation in the metal is preferably brought about by a cutting punch having a sharp edge adapted to engage with the metal layer of the laminate precisely opposite the indentation in the metal.

In a yet further aspect the invention consists in a container top formed from a laminate of the type including a metal layer and a deformable synthetic plastic layer and having a portion arranged to engage with and form a sealing contact with a container body formed by a method or apparatus according to this invention. Such container tops may be aerosol mounting cups, crown seals, screw caps, or a tin lid.

Figure 3:
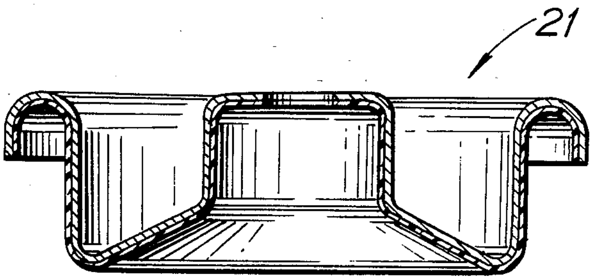
Figure 2:
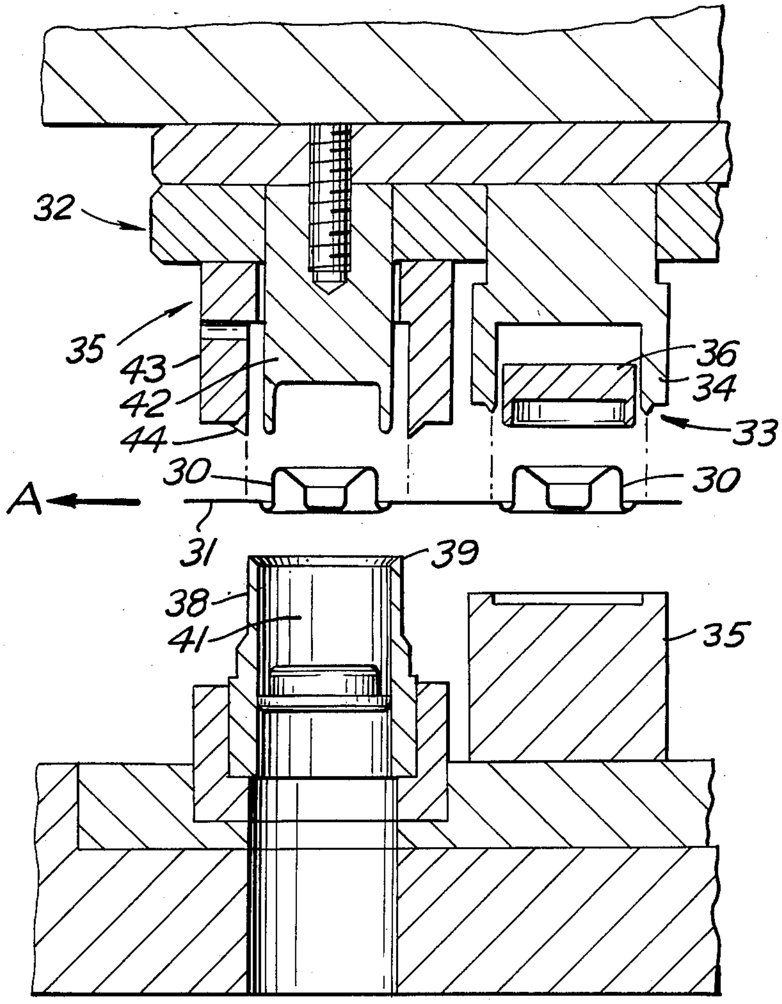

Hereinafter given by way of example only are preferred embodiments of the invention described with reference to the accompanying drawings in which:

FIG. 1 is a cross-sectional view, on an enlarged scale of a metal plastic laminate which has been formed with an indentation in the first step of the method according to this invention, FIG. 2 is a vertical sectional view of an apparatus for carrying out the method according to the present invention, as the final steps in the manufacture of a mounting cap for an aerosol container, and FIG. 3 is a vertical sectional view through a mounting cap for an aerosol container produced in the apparatus shown in FIG. 2.

FIG. 1 shows a cross-sectional view through a laminate 10. The laminate comprises a layer of tinplate 11 which is 0.28 mm thick and a layer of polyethylene 12 which is 0.23 mm thick. The polyethylene layer 12 is bonded in face to face relationship with the tinplate in known manner.

The laminate 10 is formed with a channel section indentation 13 along a line 14 upon which the laminate is to be severed. The indentation 13 extends right through the full thickness of the polyethylene layer 12 and into the tinplate layer by an amount of 0.13 mm. The indentation 13 was formed by pressing down through the polyethylene layer a die to displace the polyethylene in the line of the indentation substantially laterally. A thick layer of polyethylene may still cast the indented tinplate layer and may even be forced into the groin structure of the indented metal or in some other way bonded supplementarily to the metal.

The die has a substantially truncated V-shaped cross-section such that the indentation 13 has side walls 15 which converge at 90° to one another but which are separated at the base of the indentation by a narrow floor 16.

In the next stage of the method according to this invention the laminate 10 is severed along the line 14 in a conventional punching or shearing operation.

The apparatus shown in FIG. 2 is the last two stages of a conventional die train used to manufacture mounting cups for aerosol containers such as cup 21 shown in FIG. 3. The steps of the stamping of the general shape of a mounting cup are well known and a conventional die train may be used provided that sufficient clearance is allowed for the thickness of the plastic layer and the dies are highly polished to faciliate formation of the article without the plastics layer being separated from the metal layer of its laminate.

The method of separating a formed mounting cup blank such as cup 30 from a laminate 31 movable through the die train 32 in direction A involves a first step in which a V-section indentation is formed along the line of proposed severance which has a depth such that it extends through the plastics layer and into the metal layer of the laminate 31, and a second step of severing the blank along the line of the indentation in the metal layer.

The apparatus 32 shown in FIG. 2 therefore includes an indentation forming means 33 for forming an annular indentation, similar to indentation 13 of FIG. 1, in the lamination 31, and severing means 37 to sever a blank 30 from the lamination 31. The indentation forming means 33 comprises an annular die 34 for producing the indentation in the laminate 31, an anvil 35 on which the blanks 30 are supported and a locating punch 36 for accurately locating the blank 30 on the anvil 35 while the press in which the die train is located is operated to bring the die down on the laminate 31 to form the indentation.

The severing means 37 includes a cutting punch 38 engageable with the metal layer of the laminate 31 i.e., the lower force of laminate 31 as seen in FIG. 2. The cutting punch 38 has a sharp cutting edge 39 arranged to engage with the laminate precisely opposite the indentation formed by the die 34. The cutting punch 38 is shown as being tubular having a cylindrical outside surface and the sharp edge 39 is at the outer edge of the free end of the punch 38. The free end of the punch 38 frusto-conical so as to taper inwardly and downwardly from the edge 39 and the stamped blank 30 is arranged to be forced through a critical bore 41 of the punch 38 by the relative movement between a locating punch 42 and outer final die 43 and the cutting punch 38. The outer final die 43 is engageable with the plastics layer of the laminate 31. A rib 44 on the final die 43 is arranged to locate in the indentation in the laminate 31 and to provide a shearing action in cooperation with the cutting punch 38. This shearing action is obtained by providing a small clearance between the cylindrical outside surface of the cutting punch 38 and the cooperating bore in the final die 43. The chamfer on the rib 44 is 45° so that the rib 44 locates precisely within the indentation in the laminate 31.

Using the apparatus of FIG. 2 it is possible to produce the mounting cup 21 of FIG. 3 without any delamination of the plastics layer from the metal layer. It is noticeable that notwithstanding the turning up of the peripheral edge of the mounting cap there is no puckering or wrinkling of the plastics layer.

I claim:

1. A method of severing a laminate of the type including a layer of a metal and a layer of a flexible synthetic plastic material, the method comprising forming an indentation of substantially channel-shaped cross section in the laminate along a line on which the laminate is to be severed, the indentation being of such depth as to extend through the full thickness of the plastic layer and through a part of the thickness of the metal layer contiguous to the plastic material, such that the plastic material along the line of the indentation is substantially displaced laterally; and severing the laminate along the line of the indentation in the metal layer.

2. A method for forming a container top having a portion arranged to engage with and form a sealing contact with a container body, the method comprising the steps of:

(a) forming a blank to the general shape of the container top from a laminate of the type including a layer of a metal and a layer of a deformable synthetic plastic material, the blank formation being performed so that the plastic layer is maintained in adhesion with the metal layer and extends across the surface area of the said engagement and sealing contact portion;

(b) forming a substantially channel-shaped indentation in said blank around a closed line located radially outwardly of the said engagement and sealing contact portion, which indentation is of such depth as to extend through the full thickness of the plastic layer and through a part of the thickness of the metal layer contiguous to the plastic material, such that the plastic material along the line of the indentation is substantially displaced laterally; and (c) severing the blank along the line of the indentation in the metal layer.

3. A method as claimed in claim 1 or claim 2 in which the indentation is of a substantially V-shaped cross-section.

4. A method as claimed in claim 3 in which side walls of the indentation are each inclined to the surface of the laminate at an obtuse angle.

5. A method as claimed in any one of claims 1, 2 or 4 in which the laminate is severed along the line of the indentation in the metal by penetration of the metal layer from the face thereof opposite to the face having the indentation.

6. Apparatus for severing a laminate of the type including a layer of a metal and a layer of a deformable synthetic plastic material, the apparatus comprising means to form along a line of intended severance an indentation in a laminate of the said type, the indentation being of such a depth as to extend through the full thickness of the plastic layer and through part of the thickness of the metal layer contiguous to the plastic layer, and means for severing the laminate along the line of the indentation in the metal layer.

7. Apparatus for forming a container top having a portion arranged to engage with and form a sealing contact with a container body form a laminate of the type including a layer of a metal and a plastic material, said apparatus including:

(a) blank forming means for forming a blank, from a laminate of the said type, into the general shape of the container top with the plastic layer extending across the surface area of the said engagement and sealing contact portion;

(b) means for forming a substantially channel section indentation in said blank around a closed line located radially outwardly of the said engagement and sealing contact portion, which indentation is of such depth as to extend through the full thickness of the plastic layer and through a part of the thickness of the metal layer contiguous to the plastic layer, such that the plastic material along the line of the indentation is substantially displaced laterally; and (c) means for severing the blank along the line of the indentation in the metal layer.

8. Apparatus as claimed in claim 6 or claim 7 in which the means to form the indentation comprises a die having an indentation forming die face which is substantially V-shaped in cross section.

9. Apparatus as claimed in any one of claims 6 or 7 in which the means to sever the laminate along the line of the indentation in the metal layer comprises a punch adapted to penetrate the metal layer from the face thereof opposite to the face having the indentation.

* * * * *